Oct. 3, 1939.  L. L. SALASSI  2,174,950
GEAR-SHIFTING MECHANISM
Filed Jan. 19, 1939  4 Sheets—Sheet 1

Inventor

L. L. Salassi

By Clarence A. O'Brien
and Hyman Berman
Attorneys

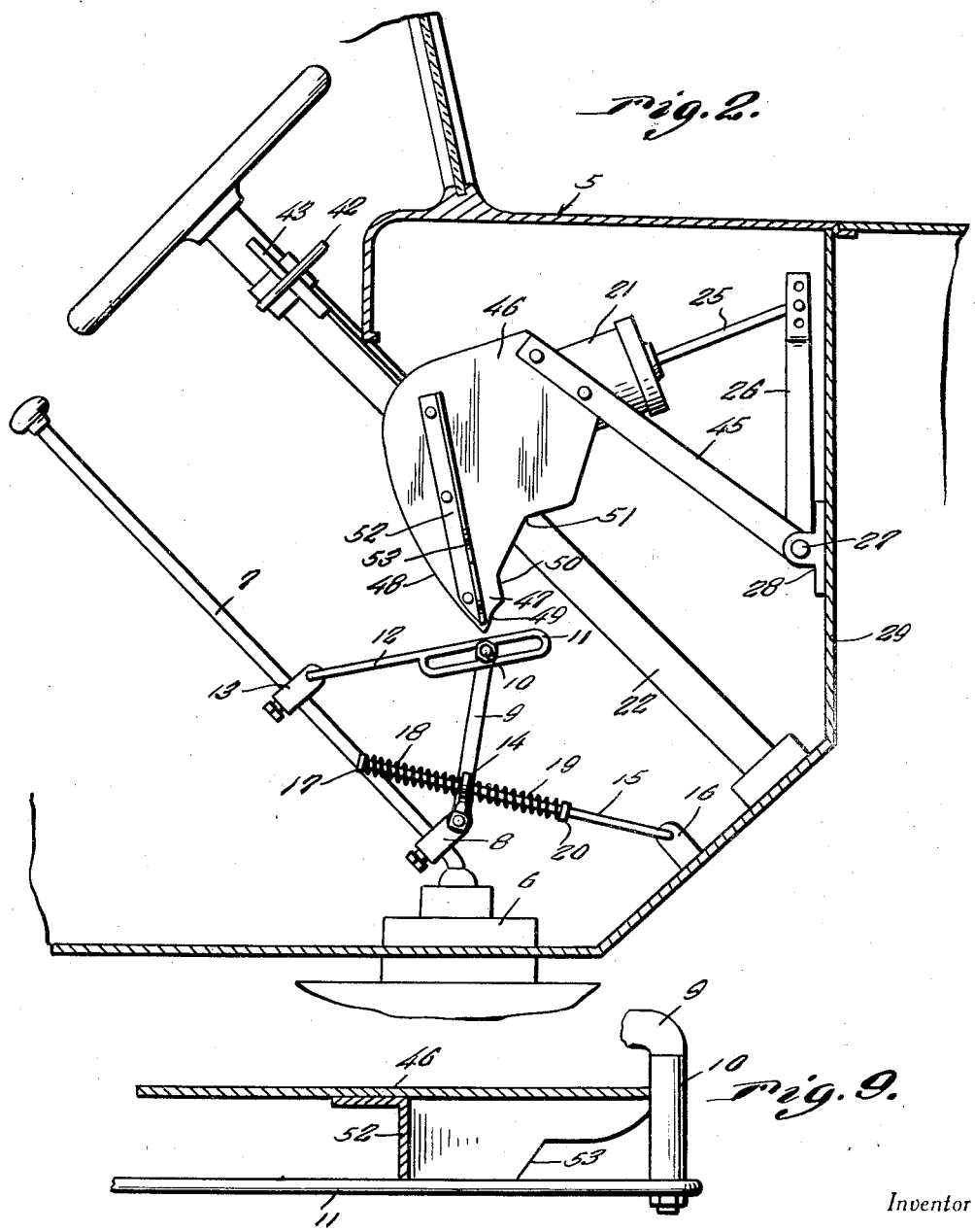

Inventor
L. L. Salassi
By Clarence A. O'Brien
and Hyman Berman
Attorneys

Oct. 3, 1939.   L. L. SALASSI   2,174,950
GEAR-SHIFTING MECHANISM
Filed Jan. 19, 1939   4 Sheets—Sheet 4
Fig. 6.
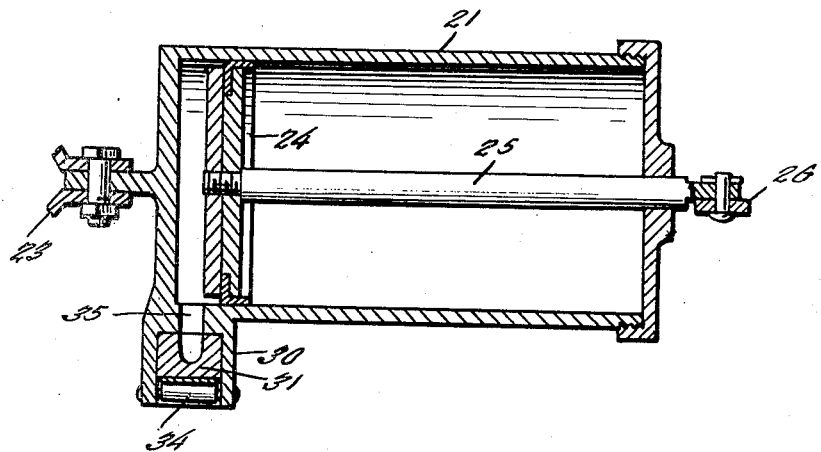
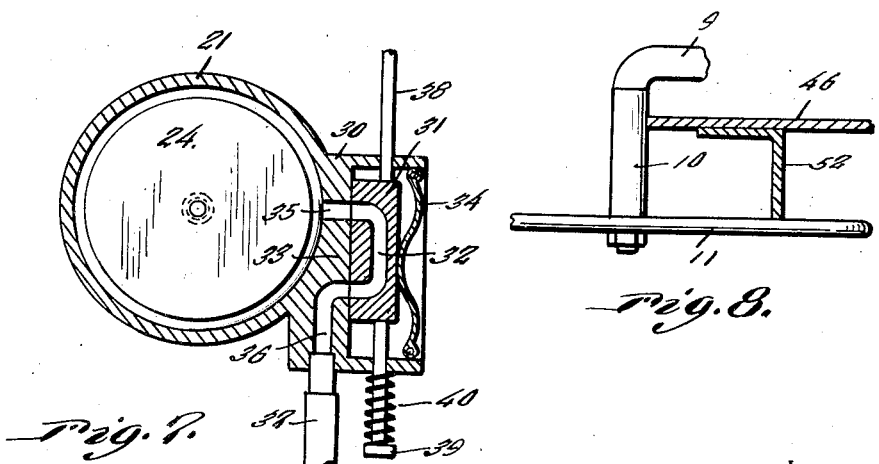
Fig. 7.   Fig. 8.
Inventor
L. L. Salassi
By Clarence A. O'Brien
and Hyman Berman
Attorneys Patented Oct. 3, 1939

2,174,950

UNITED STATES PATENT OFFICE 2,174,950

GEAR-SHIFTING MECHANISM

Louis L. Salassi, Vicksburg, Miss.

Application January 19, 1939, Serial No. 251,805

5 Claims. (Cl. 74—335)

This invention relates to a gear shifting mechanism for a conventional type of automobile transmission, and has for the primary object the provision of a device of this character which may be readily installed on an automobile and connected to the conventional gear shift lever of the transmission and in such a way that the gear shift lever may be manually operated whenever it is desired to obtain any of the various gear speeds of the automobile transmission, such as low gear, second gear, high gear or reverse gear, the present invention providing a safe and convenient means for shifting the transmission by vacuum operated means under manual control so that second gear from low gear may be obtained and from second gear to high gear obtained and back and forth between said high gear and second gear as many times as desired without the driver of the automobile having to remove the hands from the steering wheel of the automobile.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary transverse sectional view showing a portion of a motor vehicle and its transmission and steering post with the present invention mounted for the operation of the gear shift lever of the transmission.

Figure 2 is a fragmentary vertical sectional view showing the mounting of the present invention and its connection with the shifting lever of the transmission, with the shifting lever in neutral position of the transmission.

Figure 6 is a vertical sectional view illustrating the vacuum cylinder and the piston therein and a portion of the control valve, taken on the line 6—6 of Figure 3.

Figure 7 is a transverse sectional view taken on the line 7—7 of Figure 3.

Figure 8 is a detail sectional view taken on the line 8—8 of Figure 3.

Figure 9 is a detail sectional view taken on the line 9—9 of Figure 4.

Figure 1:
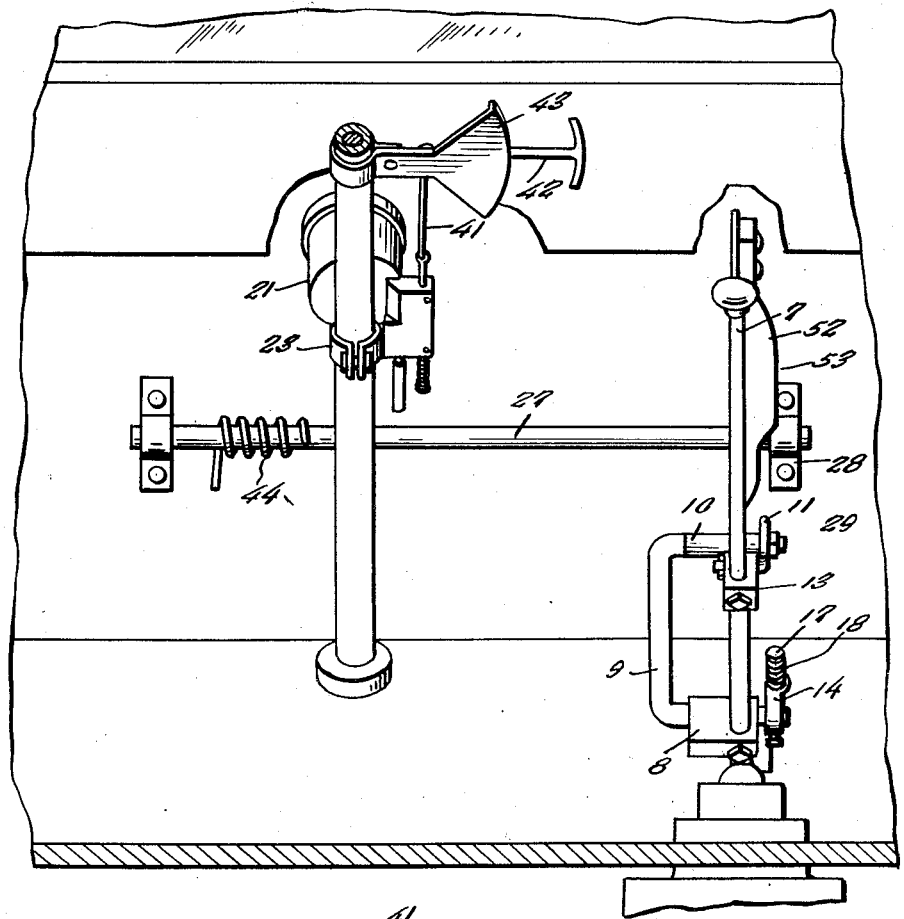
Figure 5:
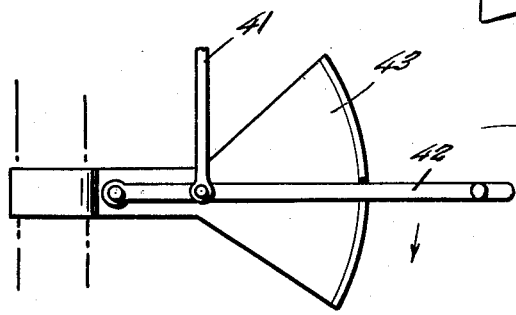
Figure 5 is a fragmentary elevational view showing the hand control lever for the actuation of the control valve of the vacuum operated device.

Referring in detail to the drawings, the numeral 5 indicates a fragmentary portion of an automobile body and 6 indicates the conventional transmission including the usual gear shift lever 7 whereby the transmission may be manually operated to obtain low, second, and high gear and reverse gear. In describing the operation of this invention it is to be understood that the transmission has the conventional shift, that is, the shifting lever 7 will be moved rearwardly of one side of the longitudinal axis of the motor vehicle to obtain low gear and forwardly on the same side of the longitudinal axis to obtain reverse gear and forwardly on the opposite side of the longitudinal axis of the automobile to obtain second gear and rearwardly on the latter-named side of the longitudinal axis of the automobile to obtain high gear with a neutral position as conventional. Further, it is to be understood that in the use of the present invention the operator must position the shifting lever in low gear in order to start the motor vehicle in action and also in reverse position when it is desired to reverse the direction of travel of the automobile, while the present invention will be employed for positioning the shift lever in either second or high gear and back and forth between said gears.

A clamp 8 is mounted on the gear shift lever 7 adjacent its point of connection with the transmission 6 and arm 9 working in clamp 8 to which is journaled a roller 10 operating in an elongated link 11. The link 11 forms an integral part of a shifting rod 12 pivoted to a clamp 13 mounted on the shifting lever 7 above the clamp 8. An apertured ear 14 is secured on lower end of arm 9 which extends through clamp 8 and has slidable therethrough a rod 15 having one end pivotally mounted on a bracket 16 carried by the automobile body, as clearly shown in the drawings. The other end of the rod 15 is equipped with a head 17. Coil springs 18 and 19 are mounted on the rod 15 at opposite sides of the apertured ear 14. The spring 18 bears against the apertured ear 14 and the head 17 on the rod 15 while the coil spring 19 bears against the apertured ear 14 and a collar 20 fixed on the rod 15. Either the spring 18 or the spring 19 will be slightly compressed when the transmission is in gear, so that the roller 10 of the arm 9 will be positioned either at one end of the link 11 or at the other end thereof, so as to be properly located to be engaged by an operating head when desiring to change gear of the vehicle.

A cylinder 21 is mounted on the steering post 22 of the automobile by a suitable clamp 23 and has slidable therein a piston 24 equipped with a stem 25 extending outwardly of the cylinder and pivotally connected to a lever 26 secured on a shaft 27. The shaft 27 is supported by bearings 28 mounted on the partition 29 located between the engine compartment and the driver's compartment of the automobile. The lever 26 has a series of openings to permit the stem 25 to be adjusted endwise of the lever 26 for the purpose of varying the throw of the lever 26 by the movement of the piston.

One end of the cylinder 21 is equipped with a valve housing 30 in which is slidably mounted a valve 31 of the slide type having a passage 32, the ends of which open outwardly through one side of the valve element and spaced from each other. The valve housing 30 is provided with a seat 33 for the valve element 31 to slide against under the influence of a spring 34. The valve seat 33 is provided with passages 35 and 36. The passage 35 connects with the cylinder 21 between one end thereof and the piston while the passage 36 has connected thereto a tube or pipe 37 adapted to be connected to the intake manifold of the engine of the automobile so that a vacuum will be developed in the passage 36 during the operation of the engine.

The valve element 31 is slidably supported by oppositely arranged rods 38 slidably mounted in the valve housing and one of said rods is provided with a head 39 and mounted on said latter-named rod between the valve housing and the head is a coil spring 40 normally acting to position the valve element so that the passage 32 thereof will be out of registration with the passages 35 and 36. The other rod 38 has connected thereto a connecting link 41 which is pivoted on an operating lever 42 operating in conjunction with a segment type bracket 43 mounted on the steering post, positioning the lever 42 in convenient reach of the fingers of a hand of the driver when the hand is on the steering wheel.

A torsion type spring 44 is mounted on and connected to the shaft 27 at one end while its opposite end bears against the partition 29 of the automobile for the purpose of rotating the shaft 27 in one direction to position the lever 26 so that the piston 24 will be moved its maximum distance away from the passage 35.

A lever 45 is secured on the shaft 27 and carries an operating head 46. The operating head 46 is in the form of a plate including an extension 47 which tapers toward its free end to engage with the roller 10 of the arm 9. One edge of the extension 47 from its pointed end toward the plate-like portion presents a cam face 48 and an opposite edge of the extension forms a series of cam faces numbered 49, 50 and 51. Secured on one side of the head 46 and extending onto the extension 47 is an angle iron plate 52 having a cam face 53.

It is to be understood that during the rotation of the shaft 27 by the piston in one direction the head 46 is moved downwardly so that the different cams may engage with the roller 10 of the arm 9 and the cam 53 to engage with the link 11 and during the rotation of the shaft 27 in a reverse direction by the piston 24 the head 46 is moved upwardly away from the roller 10 and the link 11 to assume a position as shown in Figure 2 ready to be shifted manually into any of its different gears or to be moved manually into a low gear for the purpose of setting the automobile in motion.

Figure 3:
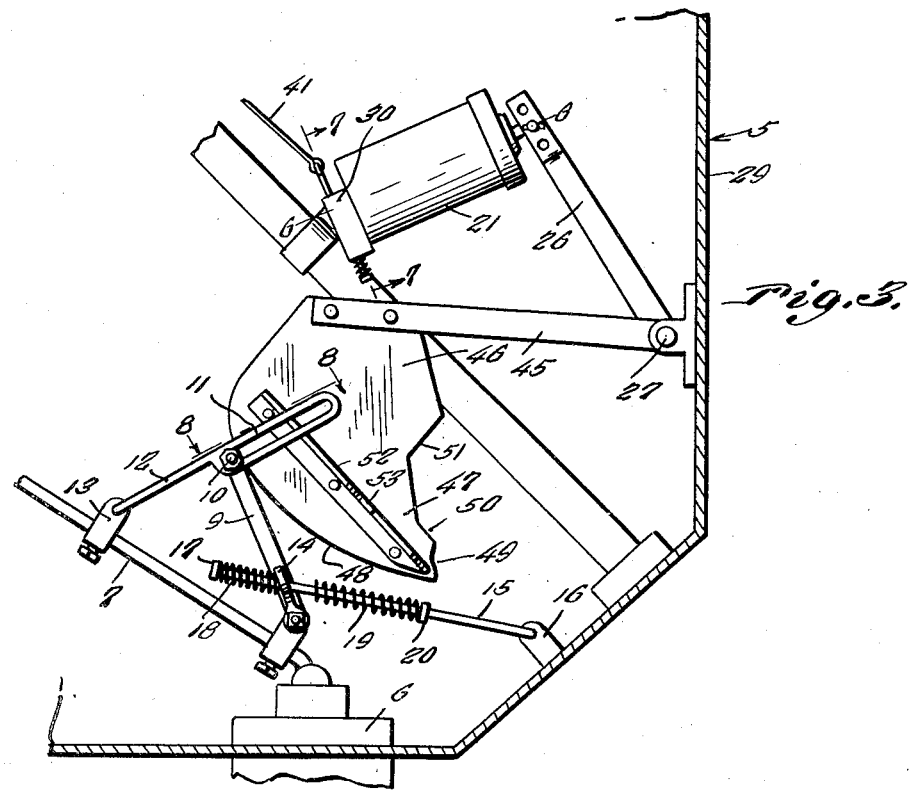
Figure 3 is a fragmentary vertical sectional view showing the shifting lever in high gear having been placed in this position by the present invention.

After the automobile has been set in motion by placing the shifting lever 7 manually in low gear, the operator moves the lever 42 by one of the fingers of the hand on the steering wheel to position the valve element 31 so that the passage 32 thereof connects the passages 35 and 36. This permits the vacuum from the intake manifold of the engine to act on the piston 24 and to move the piston in a direction to rotate the shaft 27 against the action of the spring 44 lowering the head 46. As the head 46 moves downwardly the cam 49 engages the roller and on further movement of the head 46 downwardly the roller 10 riding on the cam 49 moves the shifting lever 7 out of low gear into neutral position. A further movement of the head 46 downwardly brings the cam 50 in engagement with the roller 10 and also the cam 53 in engagement with the link. The cam 53 engaging the link causes the shifting lever which now is in neutral position to be moved laterally to change the shifting lever from one side of the longitudinal axis of the transmission or automobile to the other side for the purpose of operating second and high gears of the transmission. During the time that the shifting lever 7 is being moved laterally the cam 50 maintains the roller and arm 9 in a position to maintain the shifting lever in neutral position. On further downward movement of the operating head 46 the cam 51 engages the roller 10 and moves the shifting lever forwardly into second gear position thereby obtaining second gear for the automobile. The operator then releases the lever 42 which permits the valve 31 to be moved by the spring 40 to interrupt the vacuum to the cylinder by closing the passages 36 and 35 to each other. When the valve element 31 attains the latter-named position it uncovers the passage 35 and vents the cylinder to the atmosphere allowing the piston 24 to return to its normal position by the influence of the spring 44 which also returns the head 46 to its uppermost position. The operator then desiring to obtain high gear again operates the valve through moving the hand lever 42 to bring the passages 35 and 36 into communication, whereupon the vacuum acts on the piston 24 and lowers the head 46. On this lowering of the head 46 the roller 10 engages with the cam 48 and causes the shifting lever to be moved rearwardly into high gear, as shown in Figure 3.

It is to be understood that each time the arm 9 is moved by any one of the cams of the operating head one or the other of the springs 18 and 19 is compressed.

When it is desired to return the shifting lever to a neutral position the operator does so manually. Further it is to be understood that the roller 10 only occupies a position intermediate the end of the link 11 when the shifting lever is in neutral position and when said shifting lever is in any of its other positions the roller 10 will be engaged with one or the other of the ends of the link, as clearly shown in Figures 3 and 4 so that when the cams 48 to 51, inclusive, act on the roller 10 it will be positioned so as to create either a push or pull on the rod 12 for actuating the shifting lever into its different gear positions.

Figure 4:
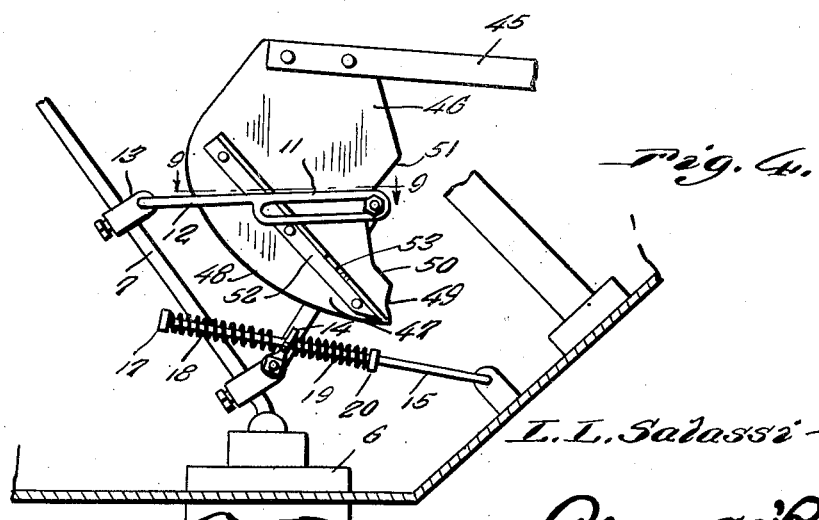
Figure 4 is a view similar to Figure 3 showing the shifting lever in second gear having been placed in this position by the present invention.

It will be further understood that when the shifting lever is in either high or second gear position it can be caused to change from one of said positions to the other of said positions by the operator actuating the lever 42 from neutral position to valve actuating position, that is, opening the passages 35 and 36 to each other for the purpose of bringing about operation of the head 46 by the piston 24 under the influence of the vacuum from the intake manifold of the engine. For instance, if the shifting lever 7 is in second gear the head 46 is in its lowermost position with the roller 10 in engagement with the cam 51, as shown in Figure 4. Lever 42 is then released and valve 3 is caused to move downwardly to vent cylinder 21 allowing the head 46 to return to its uppermost position. Now to move the shifting lever into high gear the operator operates the lever 42 upwardly to communicate the passages 35 and 36 to bring about lowering of the head 46 the cam 48 thereof will engage with the roller and bring about movement of the arm 9 rearwardly and consequently the shifting lever rearwardly into high gear position, as shown in Figure 3. Spring 18 having been compressed by rearward movement of shift lever causes top end of arm 9 to move to forward end of link 11 as soon as lower end of operating head clears roller 10. The operation of the head 46 again in a downward direction will bring about movement of the shifting lever into second gear. Thus it will be seen that the operator at will can move, through the present invention, the shifting lever back and forth between second and high gear as many times as desired.

It is believed that the foregoing description, when taken in connection with the drawings, will fully set forth the construction and advantages of this invention to those skilled in the art to which such device relates, so that further detailed description will not be required.

Having thus described my invention, I claim:

1. In combination with an automobile and the transmission thereof having a gear shift lever for manually obtaining reverse gear, low, intermediate and high gear of the transmission, an operating arm connected to the shift lever, spring means acting on said arm to move top end arm 9 from one end to the other of link 11, a movably mounted cam means carried by the automobile for moving the arm to position the shift lever from low gear position to neutral position and from the latter position to intermediate gear position and from the latter position to high gear position and back and forth between said high gear position and the intermediate gear position, and a manually controlled vacuum operated mechanism for operating said cam means.

2. In combination with an automobile and the transmission thereof having a gear shift lever for manually obtaining reverse gear, low, intermediate and high gears for the transmission, an operating arm connected to the shift lever, spring means acting on said arm to move top end arm 9 from one end to the other of link 11, a roller carried by said arm, a link pivotally connected to said shift lever and having the roller operating therein, a movably mounted cam means carried by the automobile for engaging the roller to shift the lever from low gear position to neutral position and from the latter position to intermediate position and from the latter position to high gear position, and a manually controlled vacuum operated means for operating said cam means.

3. In combination with an automobile and the transmission thereof having a gear shift lever for manually obtaining reverse gear, low, intermediate and high gears for the transmission, an operating arm connected to the shift lever, a roller carried by said arm, a link pivotally connected to the shift lever and slidably receiving the roller, an apertured ear carried by the arm, a pivotally mounted rod extending through said ear, springs carried by said rod and bearing on opposite sides of the ear to move top end arm 9 from one end to the other of link 11, a movably mounted cam means carried by the automobile for engaging the roller for moving the shift lever from low gear position to neutral position and from the latter position to intermediate gear position and from the latter position to high gear position, and a manually controlled vacuum operated mechanism for operating said cam means.

4. In combination with an automobile and the transmission thereof having a gear shift lever for manually obtaining reverse gear, low, intermediate and high gears for the transmission, an operating arm connected to the shift lever, a roller carried by said arm, a link pivotally connected to the shift lever and slidably receiving the roller, an apertured ear carried by the arm, a pivotally mounted rod extending through said ear, springs carried by said rod and bearing on opposite sides of the ear to move top end arm 9 from one end to the other of link 11, a spring influenced shaft journaled on the automobile, an arm secured to the shaft, a vacuum cylinder mounted on the automobile and connected to a vacuum source, a piston operating in said cylinder and connected to said lever, a valve for opening and closing said cylinder to said vacuum source and for bleeding said cylinder, manual operating means for said valve, and a cam means operated by said shaft to engage the roller for moving the shift lever from low gear position to neutral position and from the latter position to intermediate gear position and from the latter position to high gear position.

5. In combination with an automobile and the transmission thereof having a gear shift lever for manually obtaining reverse gear, low, intermediate and high gears for the transmission, an operating arm connected to the shift lever, a roller carried by said arm, a link pivotally connected to the shift lever and slidably receiving the roller, an apertured ear carried by the arm, a pivotally mounted rod extending through said ear, springs carried by said rod and bearing on opposite sides of the ear to move top end arm 9 from one end to the other of link 11, a spring influenced shaft journaled on the automobile, an arm secured to the shaft, a vacuum cylinder mounted on the automobile and connected to a vacuum source, a piston operating in said cylinder and connected to said lever, a valve for opening and closing said cylinder to said vacuum source and for bleeding said cylinder, manual operating means for said valve, a second lever secured on the shaft, a head carried by the second lever, and a series of cams formed on said head to engage with the roller for moving the shift lever from low gear position to neutral position and from the latter position to intermediate gear position and from the latter position to high gear position.

LOUIS L. SALASSI.